US011316702B2

(12) United States Patent
Sun et al.

(10) Patent No.: US 11,316,702 B2
(45) Date of Patent: Apr. 26, 2022

(54) VERIFICATION-BASED SERVICE AUTHORIZATION

(71) Applicant: Advanced New Technologies Co., Ltd., Grand Cayman (KY)

(72) Inventors: Xi Sun, Hangzhou (CN); Hongwei Luo, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/145,889

(22) Filed: Jan. 11, 2021

(65) Prior Publication Data
US 2021/0135882 A1 May 6, 2021

Related U.S. Application Data

(63) Continuation of application No. 16/805,316, filed on Feb. 28, 2020, now Pat. No. 10,892,900, which is a (Continued)

(30) Foreign Application Priority Data

Nov. 16, 2017 (CN) .......................... 201711135547.2

(51) Int. Cl.
*H04L 9/32* (2006.01)
*H04L 9/08* (2006.01)

(52) U.S. Cl.
CPC .......... *H04L 9/3263* (2013.01); *H04L 9/0825* (2013.01); *H04L 9/3231* (2013.01); *H04L 9/3247* (2013.01)

(58) Field of Classification Search
CPC ... H04L 9/3263; H04L 9/0825; H04L 9/3231; H04L 9/3247; H04L 63/12; H04L 63/083; G06F 21/53
See application file for complete search history.

(56) References Cited

U.S. PATENT DOCUMENTS

| 10,892,900 | B2 | 1/2021 | Sun et al. |
| 2006/0149962 | A1 | 7/2006 | Fountain et al. |

(Continued)

FOREIGN PATENT DOCUMENTS

| CN | 101108125 | 6/2010 |
| CN | 105490997 | 4/2016 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Henry Tsang
(74) *Attorney, Agent, or Firm* — Fish & Richardson P.C.

(57) ABSTRACT

The present specification discloses a service authorization method, apparatus and device. In one aspect, the method includes: obtaining, by a first execution unit that runs in a first security environment, information to be verified; generating, by the first execution unit that runs in the first security environment, a verification result of the information to be verified; signing, by the first execution unit that runs in the first security environment, the verification result using a signature verification private key to provide signature information; obtaining, by a second execution unit that runs in a second security environment, the signature information from the first execution unit; verifying, by the second execution unit that runs in the second security environment, the signature information using a signature verification public key corresponding to the signature verification private key; and in response to verifying the signature information, performing service authorization based on the verification result.

17 Claims, 9 Drawing Sheets

Related U.S. Application Data continuation of application No. PCT/CN2018/107569, filed on Sep. 26, 2018.

(56) References Cited

U.S. PATENT DOCUMENTS

| | | | |
|---|---|---|---|
| 2007/0198848 A1* | 8/2007 | Bjorn | G06F 21/35 |
| | | | 713/186 |
| 2012/0124369 A1 | 5/2012 | Amenedo et al. | |
| 2012/0284507 A1* | 11/2012 | Bostanci | H04L 9/3213 |
| | | | 713/155 |
| 2013/0238895 A1 | 9/2013 | Dixon et al. | |
| 2015/0072726 A1 | 3/2015 | Stern | |
| 2015/0121068 A1* | 4/2015 | Lindemann | H04L 63/0823 |
| | | | 713/158 |
| 2015/0188902 A1* | 7/2015 | Yoakum | H04L 63/083 |
| | | | 726/7 |
| 2016/0065374 A1 | 3/2016 | Sauerwald et al. | |
| 2016/0234176 A1 | 8/2016 | Chu | |
| 2017/0222815 A1* | 8/2017 | Meriac | G06F 21/554 |
| 2018/0241571 A1* | 8/2018 | Lu | H04L 9/14 |
| 2020/0204379 A1 | 6/2020 | Sun et al. | |

FOREIGN PATENT DOCUMENTS

| | | | |
|---|---|---|---|
| CN | 105530099 | | 4/2016 |
| CN | 106373012 | | 2/2017 |
| CN | 106850201 | | 6/2017 |
| CN | 106878280 | | 6/2017 |
| CN | 107031653 | | 8/2017 |
| CN | 107072541 | | 8/2017 |
| CN | 107092881 | | 8/2017 |
| CN | 107126203 | | 9/2017 |
| CN | 107203938 | | 9/2017 |
| CN | 107220246 | | 9/2017 |
| CN | 104900006 | | 10/2017 |
| CN | 107405072 | | 11/2017 |
| CN | 108055132 | | 5/2018 |
| TW | 201525925 | | 7/2015 |
| TW | I540528 | | 7/2016 |
| TW | I567581 | | 1/2017 |
| TW | I600307 | | 9/2017 |
| WO | WO 2016192774 | | 12/2016 |
| WO | WO 2017118437 | | 7/2017 |
| WO | WO-2017118437 A1 * | 7/2017 | G06F 21/57 |

OTHER PUBLICATIONS

Extended European Search Report in Application No. 18878119.9, dated Nov. 4, 2020, 8 pages.

Nakamoto, "Bitcoin: A Peer-to-Peer Electronic Cash System," www.bitcoin.org, 2005, 9 pages.

PCT International Preliminary Report on Patentability in International Application PCT/CN2018/107569, dated May 19, 2020, 5 pages.

PCT International Search Report and Written Opinion in PCT Appln. No. PCT/CN2018/107569, dated Jan. 7, 2019, 9 pages (with English translation of search report).

systw.net [online], "Certification", Oct. 20, 2007, retrieved on Jun. 11, 2020, retrieved from URL <http://systw.net/note/af/sblog/more.php?id=24>, 4 pages (with machine translation).

zh.wikipedia.org [online], "Public Key Infrastructure", Aug. 13, 2019, retrieved on Jun. 11, 2020, retrieved from URL <https://zh.wikipedia.org/wiki/%E5%85%AC%E9%96%8B%E9%87%91%E9%91%B0%E5%9F%BA%E7%A4%8E%E5%BB%BA%E8%A8%AD>, 13 pages (with machine translation).

* cited by examiner

VERIFICATION-BASED SERVICE AUTHORIZATION

CROSS-REFERENCE TO RELATED APPLICATIONS

This application is a continuation of and claims the benefit of priority of U.S. patent application Ser. No. 16/805,316, filed Feb. 28, 2020, which is a continuation of PCT Application No. PCT/CN2018/107569, filed on Sep. 26, 2018, which claims priority to Chinese Patent Application No. 201711135547.2, filed on Nov. 16, 2017, and each application is hereby incorporated by reference in its entirety.

TECHNICAL FIELD

The present specification relates to the field of computer technologies, and in particular, to a service authorization method, apparatus, and device.

BACKGROUND

Currently, a conventional password-based identity verification method gradually cannot satisfy convenience and security demands when identity verification is performed for a user because the conventional password-based identity verification method is easy to forget, easy to steal, and inconvenient to input. However, an identity verification method based on biometric features such as fingerprint, voiceprint, or face recognition is widely applied to various scenarios because the method is more secure and convenient.

In practice, a system in which a device runs usually includes two environments: a trusted execution environment (TEE) and an execution environment provided by a secure element (SE). A service application used to process a service usually runs in the TEE. A security application used to authorize a service to be executed by a user runs in the SE. An end-user device usually needs to verify biometric feature information to be verified entered by a user to obtain a verification result. The verification result needs to be sent to the security application for verification. The security application authorizes a service executed by the service application only after the security application determines that the verification on the verification result succeeds, so that the service application executes the service.

However, the verification result can be tampered with during transfer from the TEE to the SE. Therefore, how the security application verifies the authenticity of the verification result sent from the TEE is a problem worth consideration.

Based on the existing technology, a more effective service authorization method is needed.

SUMMARY

The present specification provides a service authorization method, to alleviate a problem, in the existing technology, that the authenticity of a verification result of identity verification generated in a security environment cannot be verified in another security environment.

The present specification provides a service authorization method, a system of a device includes at least a first security environment and a second security environment, a first execution unit runs in the first security environment, a second execution unit runs in the second security environment, and the method includes: obtaining information to be verified, and sending the information to be verified to the first execution unit for verification; receiving signature information that is returned by the first execution unit and obtained by signing a verification result by means of a signature verification private key; and sending the signature information to the second execution unit, so that the second execution unit verifies the signature information by means of a signature verification public key corresponding to the signature verification private key, and performs service authorization based on the verification result after it is determined that the verification on the signature information succeeds.

The present specification provides a service authorization apparatus, to alleviate a problem, in the existing technology, that the authenticity of a verification result of identity verification generated in a security environment cannot be verified in another security environment.

The present specification provides a service authorization apparatus, a system of a device that includes the apparatus includes at least a first security environment and a second security environment, a first execution unit runs in the first security environment, a second execution unit runs in the second security environment, and the apparatus includes: an acquisition module, configured to obtain information to be verified, and send the information to be verified to the first execution unit for verification; a receiving module, configured to receive signature information that is returned by the first execution unit and obtained by signing a verification result by means of a signature verification private key; and a sending module, configured to send the signature information to the second execution unit, so that the second execution unit verifies the signature information by means of a signature verification public key corresponding to the signature verification private key, and performs service authorization based on the verification result after it is determined that the verification on the signature information succeeds.

The present specification provides a service authorization device, to alleviate a problem, in the existing technology, that the authenticity of a verification result of identity verification generated in a security environment cannot be verified in another security environment.

The present specification provides a service authorization device, including one or more memories coupled to one or more processors and having instructions stored thereon which, when executed by the one or more processors, cause the one or more processors to perform the following steps: obtaining information to be verified, and sending the information to be verified to a first execution unit for authorization, where the first execution unit runs in a first security environment included in a system of the device; receiving signature information that is returned by the first execution unit and obtained by signing a verification result by means of a signature verification private key; and sending the signature information to a second execution unit, so that the second execution unit verifies the signature information by means of a signature verification public key corresponding to the signature verification private key, and performs service authorization based on the verification result after it is determined that the verification on the signature information succeeds, where the second execution unit runs in a second security environment included in the system of the device.

The present specification provides a service authorization method, to alleviate a problem, in the existing technology, that the authenticity of a verification result of identity verification generated in a security environment cannot be verified in another security environment.

The present specification provides a service authorization method, a system of a device includes at least a first security environment and a second security environment, a first execution unit runs in the first security environment, a second execution unit runs in the second security environment, and the method includes: receiving, by the first execution unit, information to be verified sent by a service application; verifying the information to be verified, and signing an obtained verification result by means of a signature verification private key stored in the first execution unit to obtain signature information; and sending the signature information to the second execution unit by using the service application, so that the second execution unit verifies the signature information by means of a signature verification public key corresponding to the signature verification private key, and performs service authorization based on the verification result after the verification on the signature information succeeds.

The present specification provides a service authorization apparatus, to alleviate a problem, in the existing technology, that the authenticity of a verification result of identity verification generated in a security environment cannot be verified in another security environment.

The present specification provides a service authorization apparatus, a system of a device includes at least a first security environment and a second security environment, the apparatus runs in the first security environment, a second execution unit runs in the second security environment, and the apparatus includes: a receiving module, configured to receive information to be verified sent by a service application; a verification module, configured to verify the information to be verified, and sign an obtained verification result by means of a stored signature verification private key to obtain signature information; and a sending module, configured to send the signature information to the second execution unit by using the service application, so that the second execution unit verifies the signature information by means of a signature verification public key corresponding to the signature verification private key, and performs service authorization based on the verification result after the verification on the signature information succeeds.

The present specification provides a service authorization device, to alleviate a problem, in the existing technology, that the authenticity of a verification result of identity verification generated in a security environment cannot be verified in another security environment.

The present specification provides a service authorization device, including one or more memories and processors, where the memory stores a program, and the program is executed by the one or more processors to perform the following steps: receiving information to be verified sent by a service application, where a first execution unit runs in a first security environment included in a system of the device; verifying the information to be verified, and signing an obtained verification result by means of a stored signature verification private key to obtain signature information; and sending the signature information to a second execution unit by using the service application, so that the second execution unit verifies the signature information by means of a signature verification public key corresponding to the signature verification private key, and performs service authorization based on the verification result after the verification on the signature information succeeds, where the second execution unit runs in a second security environment included in the system of the device.

The present specification provides a service authorization method, to alleviate a problem, in the existing technology, that the authenticity of a verification result of identity verification generated in a security environment cannot be verified in another security environment.

The present specification provides a service authorization method, a system of a device includes at least a first security environment and a second security environment, a first execution unit runs in the first security environment, a second execution unit runs in the second security environment, and the method includes: obtaining, by the second execution unit, signature information sent by the first execution unit by using a service application, where the signature information is obtained after the first execution unit signs a verification result by means of a signature verification private key, and the verification result is obtained after the first execution unit verifies information to be verified sent by the service application; and verifying the signature information by means of a signature verification public key corresponding to the signature verification private key, and performing, after it is determined that the verification on the signature information succeeds, service authorization based on the verification result obtained by parsing the signature information.

The present specification provides a service authorization apparatus, to alleviate a problem, in the existing technology, that the authenticity of a verification result of identity verification generated in a security environment cannot be verified in another security environment.

The present specification provides a service authorization apparatus, a system of a device includes at least a first security environment and a second security environment, a first execution unit runs in the first security environment, the apparatus runs in the second security environment, and the apparatus includes: an acquisition module, configured to obtain signature information sent by the first execution unit by using a service application, where the signature information is obtained after the first execution unit signs a verification result by means of a signature verification private key, and the verification result is obtained after the first execution unit verifies information to be verified sent by the service application; and a verification module, configured to verify the signature information by means of a signature verification public key corresponding to the signature verification private key, and perform, after it is determined that the verification on the signature information succeeds, service authorization based on the verification result obtained by parsing the signature information.

The present specification provides a service authorization device, to alleviate a problem, in the existing technology, that the authenticity of a verification result of identity verification generated in a security environment cannot be verified in another security environment.

The present specification provides a service authorization device, including one or more memories and processors, where the memory stores a program, and the program is executed by the one or more processors to perform the following steps: obtaining signature information sent by a first execution unit by using a service application, where the signature information is obtained after the first execution unit signs a verification result by means of a signature verification private key, the verification result is obtained after the first execution unit verifies information to be verified sent by the service application, the first execution unit runs in a first security environment included in a system of the device, and a second execution unit runs in a second security environment included in the system of the device; and verifying the signature information by means of a signature verification public key corresponding to the signature verification private key, and performing, after it is determined that the verification on the signature information succeeds, service authorization based on the verification result obtained by parsing the signature information.

The at least one technical solution used in the present specification can achieve the following beneficial effects:

In one or more implementations of the present specification, the first execution unit running in the first security environment can verify the obtained information to be verified, sign the obtained verification result by means of the stored signature verification private key, and then send the obtained signature information to the second execution unit running in the second security environment by using the service application, and the second execution unit can verify the signature information by means of the signature verification public key corresponding to the signature verification private key, and perform service verification based on the verification result after it is determined that the verification on the signature information succeeds. In other words, in an asymmetric encryption method, the second execution unit running in the second security environment can verify the authenticity of the verification result obtained by the first execution unit running in the first security environment. Therefore, the second execution unit can determine, based on the verification result obtained by the first execution unit, whether to authorize a service executed by the service application, and thereby a more secure and effective identity verification method is provided for a user.

BRIEF DESCRIPTION OF DRAWINGS

The accompanying drawings described here are intended to provide a further understanding of the present specification, and constitute a part of the present specification. The illustrative implementations of the present specification and description thereof are intended to describe the present specification, and constitute no limitation on the present specification. In the accompanying drawings.

DESCRIPTION OF IMPLEMENTATIONS

Figure 1:
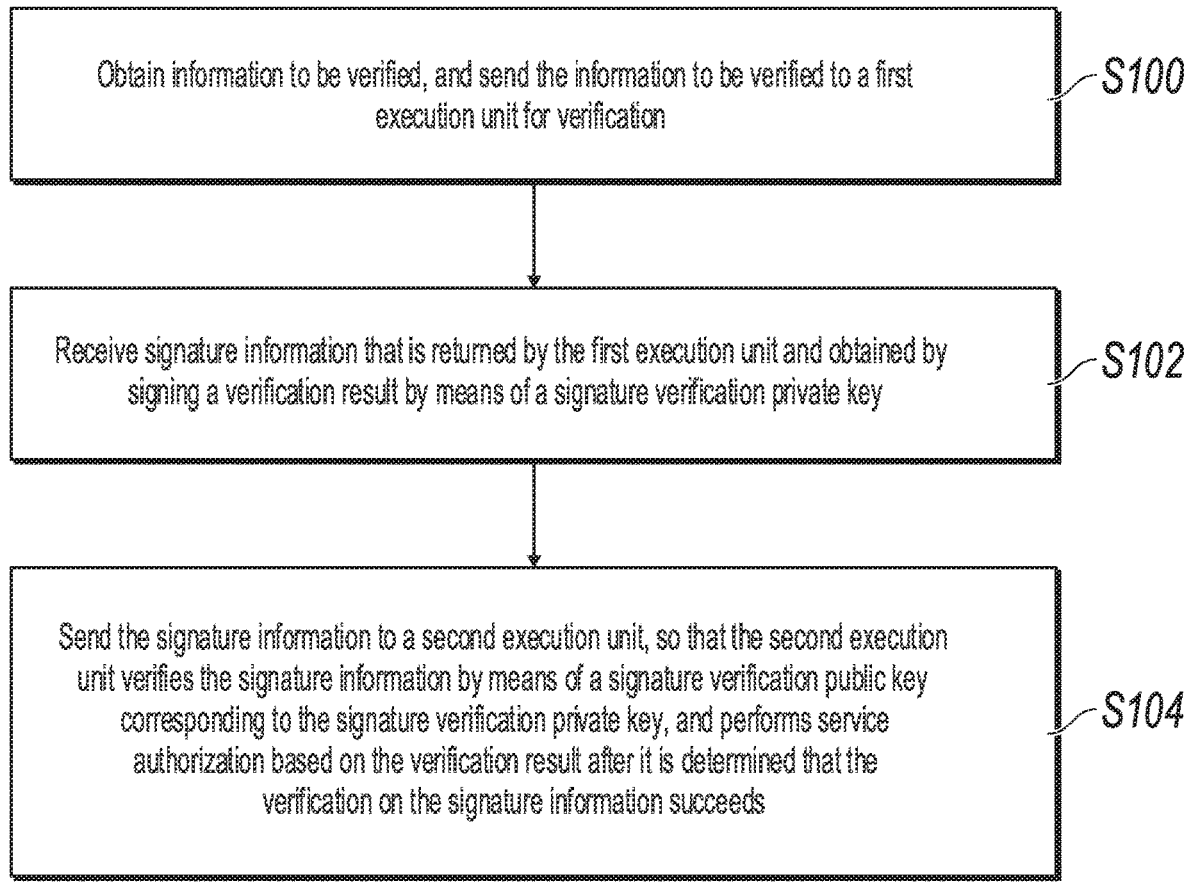
FIG. 1 is a schematic diagram illustrating a service authorization process, according to an implementation of the present specification.

A system in which a device runs usually includes different security environments. In practice, execution units or applications in the different security environments usually need to collaborate with each other to complete an entire service execution process. A service application running in a first security environment can send information to be verified obtained by the device to a first execution unit running in the first security environment. The first execution unit can verify the information to be verified, and send an obtained verification result to a second execution unit running in a second security environment. The second execution unit can determine, by using the verification result, whether to authorize a service currently executed by the service application.

Because the first execution unit and the second execution unit are located in different security environments, the second execution unit running in the second security environment usually cannot ensure that the verification result obtained after the first execution unit running in the first security environment verifies the information to be verified is not tampered with when the verification result is sent to the second execution unit. Therefore, how the second execution unit verifies the authenticity of the verification result sent by the first execution unit is a problem worth consideration.

Therefore, the present specification provides a service authorization method. In the method, after information to be verified is obtained, the information to be verified can be sent to a first execution unit, so that the first execution unit verifies the information to be verified, and signs an obtained verification result by means of a signature verification private key stored by the first execution unit to obtain signature information. Then, a service application can obtain the signature information returned by the first execution unit, and then send the signature information to a second execution unit, so that the second execution unit verifies the signature information by means of a signature verification public key corresponding to the signature verification private key, and performs service authorization based on the verification result after it is determined that the verification on the signature information succeeds.

In an asymmetric encryption method, the second execution unit running in a second security environment can verify the authenticity of the verification result obtained by the first execution unit running in a first security environment. Therefore, the second execution unit can determine, based on the verification result obtained by the first execution unit, whether to authorize a service executed by the service application, and thereby a more secure and effective identity verification method is provided for a user.

To make a person skilled in the art better understand the technical solutions in one or more implementations of the present specification, the following clearly and comprehensively describes the technical solutions in the one or more implementations of the present specification with references to the accompanying drawings in the one or more implementations of the present specification. Apparently, the described implementations are merely some but not all of the implementations of the present specification. All other implementations obtained by a person of ordinary skill in the art based on the implementations of the present specification without creative efforts shall fall within the protection scope of the present specification.

FIG. 1 is a schematic diagram illustrating a service authorization process, according to an implementation of the present specification. The process includes the following steps.

S100. Obtain information to be verified, and send the information to be verified to a first execution unit for verification.

In the present specification, when executing a service, a user can input the information to be verified to a service application in a device, so that the service application verifies the information to be verified by using the first execution unit in the device. The device mentioned here can be mobile end-user devices such as a smartphone or a tablet computer. The information to be verified mentioned here can be biometric feature information to be verified such as fingerprint, voiceprint, or facial information, or can be information to be verified in a form of characters. Certainly, the device can alternatively directly send the collected information to be verified to the first execution unit through a predetermined interface.

After obtaining the information to be verified, the first execution unit can verify the information to be verified, and obtain a corresponding verification result. For example, after obtaining a fingerprint to be verified, the first execution unit can match the fingerprint to be verified with pre-stored fingerprint information of the user, and determine, based on a matching result, whether fingerprint the verification on the user succeeds.

It is worthwhile to note that in the present specification, a first security environment can be a TEE, and the first execution unit running in the first security environment can be a module used to verify information. The module can be in a form of software, or can be in a form of hardware. A second security environment can be an execution environment provided by an SE. Correspondingly, a second execution unit can be a security application running in the SE.

S102. Receive signature information that is returned by the first execution unit and obtained by signing the verification result by means of a signature verification private key.

After verifying the information to be verified, the first execution unit can sign the obtained verification result by means of the signature verification private key stored by the first execution unit to obtain the corresponding signature information, and return the signature information to the service application in a subsequent process.

In the present specification, the first execution unit can obtain the signature verification private key used to sign the verification result from a first management server corresponding to the first execution unit. The first management server can generate a unique pair of keys for the first execution unit, namely, a signature verification private key and a signature verification public key, and send the signature verification private key to the first execution unit. The verification public key can be sent to the second management server corresponding to the second execution unit by the first management server, so that in subsequent process, the verification public key can be sent to the second execution unit by the second management server, so that the second execution unit can verify the signature information generated in the first execution unit by means of the verification public key.

In the present specification, the first execution unit can return the obtained signature information to the service application, so that the service application subsequently sends the signature information to the second execution unit for verification. A reason why the first execution unit needs to send the signature information to the second execution unit by using the service application lies in that, because the first execution unit and the second execution unit are located in different security environments and the second execution unit does not perform access authorization for the first execution unit, the first execution unit usually cannot send information to the second execution unit running in the second security environment, and because the second execution unit needs to authorize a service executed by the service application, the second execution unit usually performs access authorization for the service application, and allows the service application to access the second execution unit. Based on this, the first execution unit needs to send the signature information to the second execution unit by using the service application.

S104. Send the signature information to the second execution unit, so that the second execution unit verifies the signature information by means of the signature verification public key corresponding to the signature verification private key, and performs service authorization based on the verification result after it is determined that the verification on the signature information succeeds.

The service application can send, to the second execution unit running in the second security environment, the signature information returned by the first execution unit. The second execution unit can verify the signature information by means of the obtained signature verification public key, and then after it is determined that the verification on the signature information succeeds, can determine, by using the verification result obtained through parsing, whether to authorize the service executed by the service application.

It can be seen from the previous method that the first execution unit running in the first security environment can verify the obtained information to be verified, sign the obtained verification result by means of the stored signature verification private key, and then send the obtained signature information to the second execution unit running in the second security environment by using the service application, and the second execution unit can verify the signature information by means of the signature verification public key corresponding to the signature verification private key, and perform service verification based on the verification result after it is determined that the verification on the signature information succeeds. In other words, in an asymmetric encryption method, the second execution unit running in the second security environment can verify the authenticity of the verification result obtained by the first execution unit running in the first security environment. Therefore, the second execution unit can determine, based on the verification result obtained by the first execution unit, whether to authorize a service executed by the service application, and thereby a more secure and effective identity verification method is provided for a user.

In the previously described service authorization process, the device used by the user can be subject to a replay attack. To be specific, after obtaining the verification result indicating that verification succeeds, a hacker can continuously apply to the second execution unit for service authorization by using the verification result, and this may result in loss of user's information or property.

Figure 2:
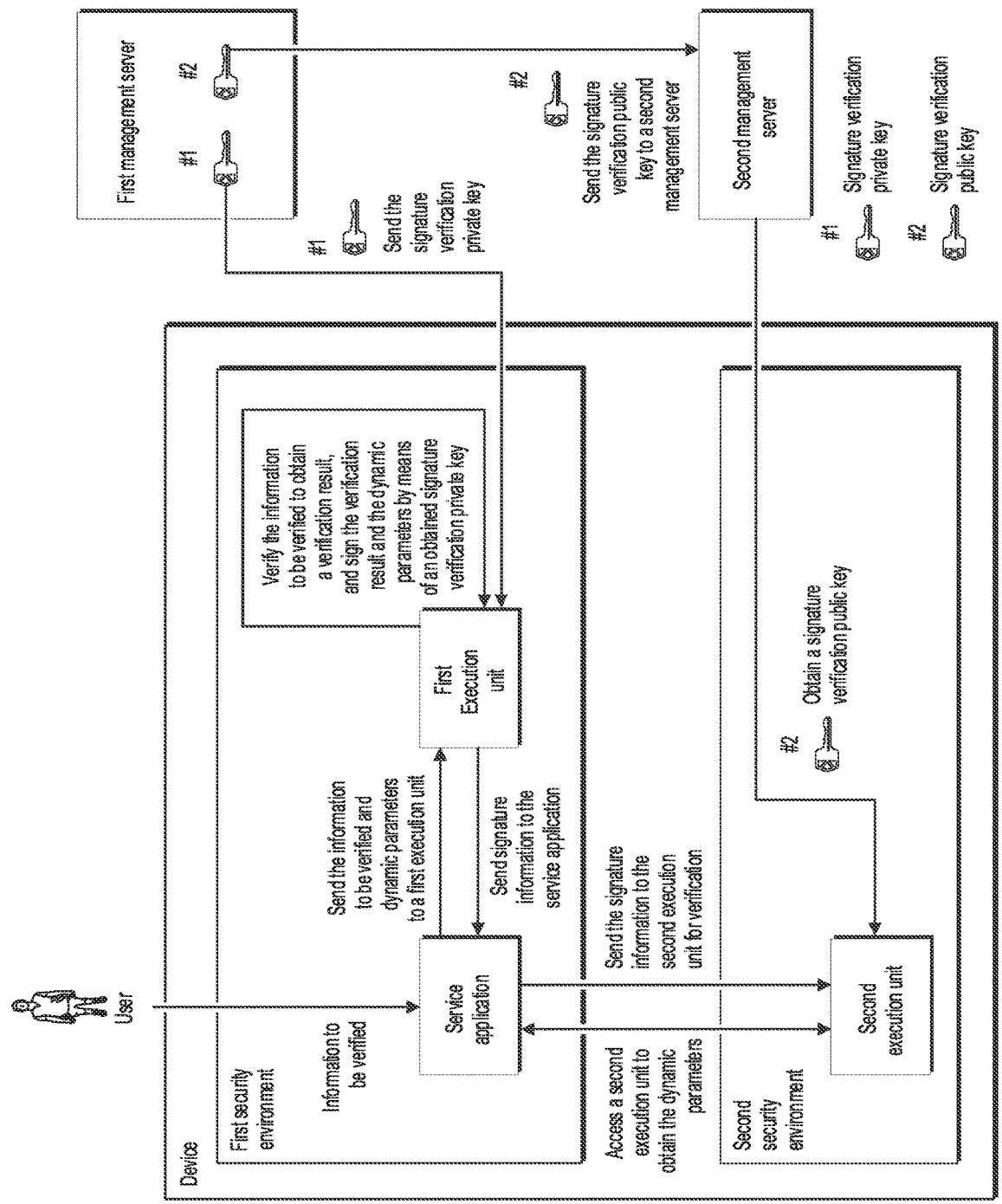
FIG. 2 is a schematic diagram illustrating a process in which a service application applies to a second execution unit for service authorization by using a dynamic parameter sent by the second execution unit, according to an implementation of the present specification.

To prevent the previously described case, the service application can obtain a dynamic parameter generated by the second execution unit from the second execution unit, and send the dynamic parameter to the first execution unit, so that the first execution unit signs the dynamic parameter and the obtained verification result to obtain the signature information, as shown in FIG. 2.

FIG. 2 is a schematic diagram illustrating a process in which a service application applies to a second execution unit for service authorization by using a dynamic parameter sent by the second execution unit, according to an implementation of the present specification.

In FIG. 2, the service application can access the second execution unit running in a second security environment to obtain dynamic parameters such as a random number or time information. The dynamic parameter can be generated by the second execution unit and stored in the second execution unit for a specified time. The second execution unit can delete the dynamic parameter after the specified time expires. Here, it can be understood as that the second execution unit sets a validity time for the generated dynamic parameter. To be specific, only when the service application sends signature information obtained after a first execution unit signs a dynamic parameter and a verification result to the second execution unit within the validity time, the second execution unit can verify, by using the stored dynamic parameter, the dynamic parameter obtained by parsing the signature information, and once the validity time expires, the dynamic parameter is invalid. As such, the dynamic parameter obtained by parsing the signature information cannot be verified by the second execution unit.

The first execution unit can verify information to be verified sent by the service application to obtain the corresponding verification result, and sign the verification result and the obtained dynamic parameter by means of a stored signature verification private key to obtain the signature information.

The first execution unit can return the obtained signature information to the service application, and the service application sends the signature information to the second execution unit. The second execution unit can verify the signature information by means of a signature verification public key obtained from a second management server, and after it is determined that the verification on the signature information succeeds, verify, based on the pre-stored dynamic parameter, the dynamic parameter obtained by parsing the signature information, to be specific, compare the dynamic parameter obtained through parsing with the stored dynamic parameter to determine whether the dynamic parameter obtained through parsing is consistent with the stored dynamic parameter, and determine that the verification on the dynamic parameter obtained through parsing succeeds when the dynamic parameter obtained through parsing is consistent with the stored dynamic parameter, or determine that the verification on the dynamic parameter obtained through parsing fails when the dynamic parameter obtained through parsing is inconsistent with the stored dynamic parameter. After it is determined that the verification on the dynamic parameter succeeds, whether to authorize a service executed by the service application can be determined based on the verification result obtained by parsing the signature information.

The signature verification public key and the signature verification private key mentioned here are generated by a first management server corresponding to the first execution unit. The first management server can send the generated signature verification private key to the first execution unit for storage, and send the signature verification public key to the second execution unit by using the second management server corresponding to the second execution unit.

The dynamic parameter obtained by the service application from the second execution unit varies with each service execution process. Therefore, a hacker cannot continuously apply to the second execution unit for service authorization in a replay attack way by using a certain successful verification result, and thereby information and property security of a user can be ensured.

It is worthwhile to note that the first management server can generate a unique signature verification key pair for a different first execution unit, or can generate a signature verification key pair for a batch of first execution units. In other words, the first management server can generate a signature verification key pair uniquely corresponding to each device, or can generate a signature verification key pair corresponding to a batch of devices.

In the present specification, the service application can obtain the dynamic parameter from the second execution unit on many occasions. For example, the service application can first obtain the dynamic parameter from the second execution unit, and then send the dynamic parameter and the obtained information to be verified to the first execution unit, or can first send the information to be verified to the first execution unit, and then obtain the dynamic parameter from the second execution unit and send the dynamic parameter to the first execution unit.

In the present specification, the signature verification public key generated by the first management server can be sent to a certificate authority (CA) for notarization, and a corresponding public key certificate is obtained. Subsequently, the second execution unit can verify, by using the public key certificate, the signature information sent by the service application, as shown in FIG. 3.

Figure 3:
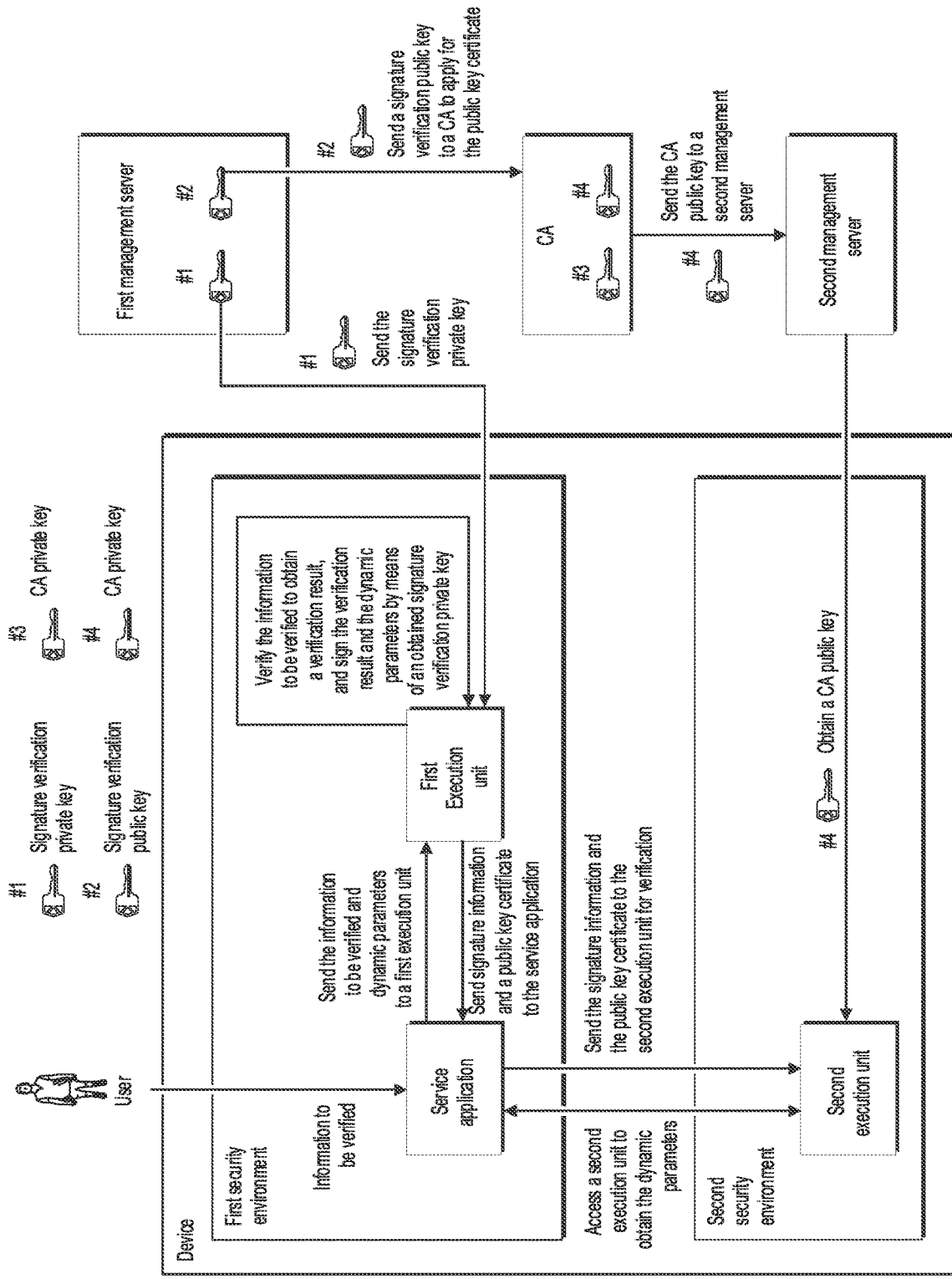
FIG. 3 is a schematic diagram illustrating verifying signature information by using a public key certificate, according to an implementation of the present specification.

FIG. 3 is a schematic diagram illustrating verifying signature information by using a public key certificate, according to an implementation of the present specification.

After generating a signature verification key pair, a first management server corresponding to a first execution unit can send a signature verification public key in the signature verification key pair to a CA for notarization. The CA can generate, based on the signature verification public key and other information (for example, information about an applicant applying for notarization of the signature verification public key and time information), a public key certificate signed by means of a CA private key stored by the CA. Then, the CA can send the public key certificate to the first execution unit by using the first management server for storage, and send a CA public key corresponding to the CA private key to a second execution unit by using a second management server for storage.

As such, after generating signature information, the first execution unit can send the signature information and the public key certificate to the second execution unit by using a service application, and the second execution unit can verify the public key certificate by means of the obtained CA public key, and verify the signature information by means of the signature verification public key obtained by parsing the public key certificate. After it is determined that the verification on the signature information succeeds, a dynamic parameter obtained by parsing the signature information is verified, and after it is determined that the verification on the dynamic parameter succeeds, whether to authorize a service currently executed by the service application is determined based on a verification result obtained by parsing the signature information.

In the present specification, after it is determined that the verification on information to be verified sent by the service application succeeds, the first execution unit can sign the obtained dynamic parameter to obtain the corresponding signature information. When receiving the signature information by using the service application, the second execution unit can determine that verification performed by the first execution unit on the information to be verified succeeds, and then when determining that the verification on the dynamic parameter obtained by parsing the signature information succeeds, can authorize the service currently executed by the service application.

In the present specification, the service application can display data such as the signature information obtained from the first execution unit to a user through an interface that can be provided when the service application runs in a first security environment. Similarly, the first execution unit can also display, through an interface that can be provided when the first execution unit runs in the first security environment, the verification result obtained after the verification on the information to be verified is performed, so that the user can view the verification result.

It can be seen from the previous method that in an asymmetric encryption method, the second execution unit running in a second security environment can verify the authenticity of the verification result obtained by the first execution unit running in the first security environment. Therefore, the second execution unit can determine, based on the verification result obtained by the first execution unit, whether to authorize the service executed by the service application.

In addition, in the previous method, the second execution unit can verify the authenticity of biometric feature verification performed by the first execution unit. As such, for a service that requires collaboration between two different security environments, identity verification can be performed for the user by using biometric recognition, a simple and easy-to-operate verification method, and therefore a good user experience is achieved in a process of executing the service by the user.

Figure 5:
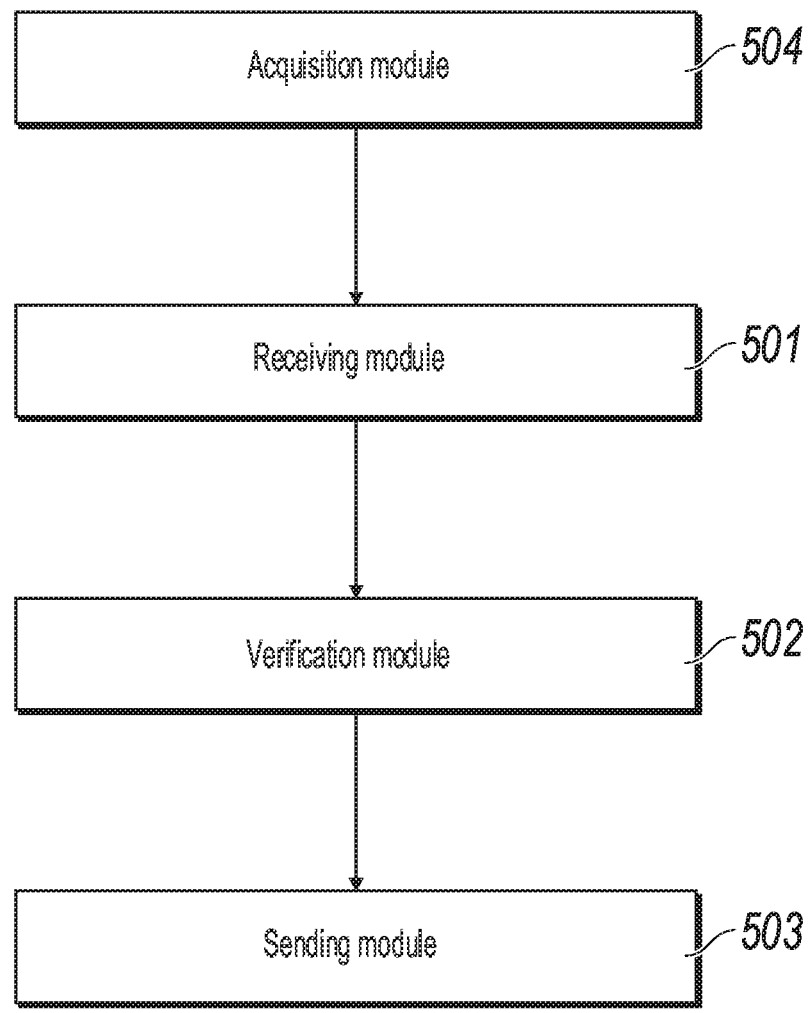
FIG. 5 is a schematic diagram illustrating a service authorization apparatus, according to an implementation of the present specification.
Figure 6:
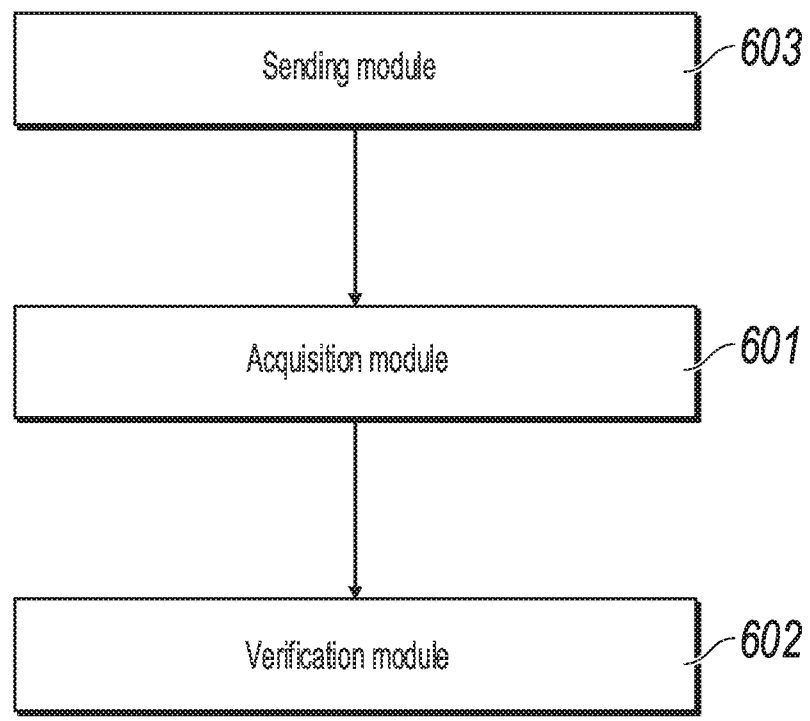
FIG. 6 is a schematic diagram illustrating a service authorization apparatus, according to an implementation of the present specification.

The service authorization method provided in the one or more implementations of the present specification is described above. Based on the same idea, the present specification further provides corresponding service authorization apparatuses, as shown in FIG. 4, FIG. 5, and FIG. 6.

Figure 4:
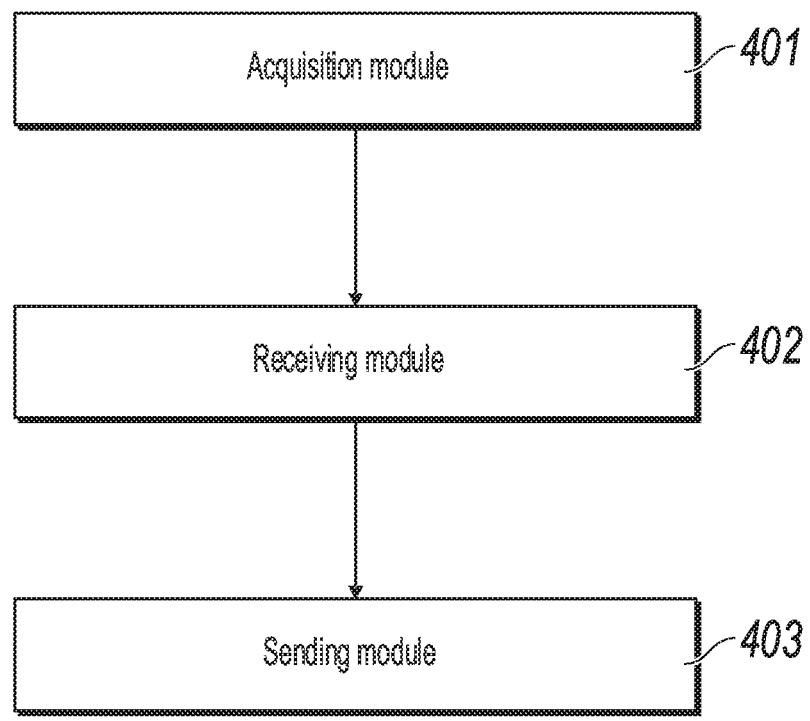
FIG. 4 is a schematic diagram illustrating a service authorization apparatus, according to an implementation of the present specification.

FIG. 4 is a schematic diagram illustrating a service authorization apparatus, according to an implementation of the present specification. The apparatus includes: an acquisition module 401, configured to obtain information to be verified, and send the information to be verified to a first execution unit for verification; a receiving module 402, configured to receive signature information that is returned by the first execution unit and obtained by signing a verification result by means of a signature verification private key; and a sending module 403, configured to send the signature information to a second execution unit, so that the second execution unit verifies the signature information by means of a signature verification public key corresponding to the signature verification private key, and performs service authorization based on the verification result after it is determined that the verification on the signature information succeeds.

A first security environment includes a trusted execution environment (TEE), and a second security environment includes an execution environment provided by a secure element (SE).

The information to be verified includes biometric feature information to be verified.

The acquisition module 401 is configured to obtain a dynamic parameter sent by the second execution unit, where the dynamic parameter includes at least one of a random number or time information; and send the dynamic parameter to the first execution unit, so that the first execution unit signs the verification result and the dynamic parameter by means of the signature verification private key.

FIG. 5 is a schematic diagram illustrating a service authorization apparatus, according to an implementation of the present specification. The apparatus includes: a receiving module 501, configured to receive information to be verified sent by a service application; a verification module 502, configured to verify the information to be verified, and sign an obtained verification result by means of a stored signature verification private key to obtain signature information; and a sending module 503, configured to send the signature information to a second execution unit by using the service application, so that the second execution unit verifies the signature information by means of a signature verification public key corresponding to the signature verification private key, and performs service authorization based on the verification result after the verification on the signature information succeeds.

The service application runs in a first security environment.

The receiving module 501 is configured to receive dynamic parameters sent by the second execution unit by using the service application.

The verification module 502 is configured to sign the verification result and the dynamic parameter by means of the signature verification private key to obtain the signature information.

The apparatus further includes: an acquisition module 504, configured to obtain the signature verification private key from a first management server corresponding to the apparatus.

The acquisition module 504 is configured to obtain a public key certificate of the signature verification public key from the first management server, where the public key certificate is obtained by the first management server from a certificate authority (CA), and the public key certificate is obtained after the CA verifies the signature verification public key based on a stored CA private key.

The sending module 503 is configured to send the public key certificate and the signature information to the second execution unit by using the service application, so that the second execution unit verifies the public key certificate by means of a CA public key obtained from the CA, and verifies, after it is determined that the verification on the public key certificate succeeds, the signature information by means of the signature verification public key obtained by parsing the public key certificate.

FIG. 6 is a schematic diagram illustrating a service authorization apparatus, according to an implementation of the present specification. The apparatus includes: an acquisition module 601, configured to obtain signature information sent by a first execution unit by using a service application, where the signature information is obtained after the first execution unit signs a verification result by means of a signature verification private key, and the verification result is obtained after the first execution unit verifies information to be verified sent by the service application; and a verification module 602, configured to verify the signature information by means of a signature verification public key corresponding to the signature verification private key, and perform, after it is determined that the verification on the signature information succeeds, service authorization based on the verification result obtained by parsing the signature information.

The signature verification public key is obtained by the apparatus from a first management server corresponding to the first execution unit by using a second management server corresponding to the apparatus.

The acquisition module 601 is configured to obtain a CA public key from a certificate authority (CA) by using a second management server corresponding to the apparatus.

The verification module 602 is configured to verify, by means of the CA public key, a public key certificate sent from the service application, where the public key certificate is obtained after the CA verifies the signature verification public key based on a CA private key corresponding to the CA public key, the public key certificate is obtained by the service application from the first execution unit, and the public key certificate is obtained by the first execution unit from the CA by using a first management server corresponding to the first execution unit; and verify, after it is determined that the verification on the public key certificate succeeds, the signature information by means of the signature verification public key obtained by parsing the public key certificate, and perform, after it is determined that the verification on the signature information succeeds, service authorization based on the verification result obtained by parsing the signature information.

The apparatus further includes: a sending module 603, configured to send a dynamic parameter to the service application, so that the first execution unit signs, by means of the signature verification private key, the verification result and the dynamic parameter obtained from the service application to obtain the signature information.

The verification module 602 is configured to verify the public key certificate by means of the CA public key; verify, after it is determined that the verification on the public key certificate succeeds, the signature information by means of the signature verification public key obtained by parsing the public key certificate; and verify, after it is determined that the verification on the signature information succeeds, the dynamic parameter obtained by parsing the signature information, and perform, after it is determined that the verification on the dynamic parameter succeeds, service authorization based on the verification result obtained by parsing the signature information.

Figure 7:
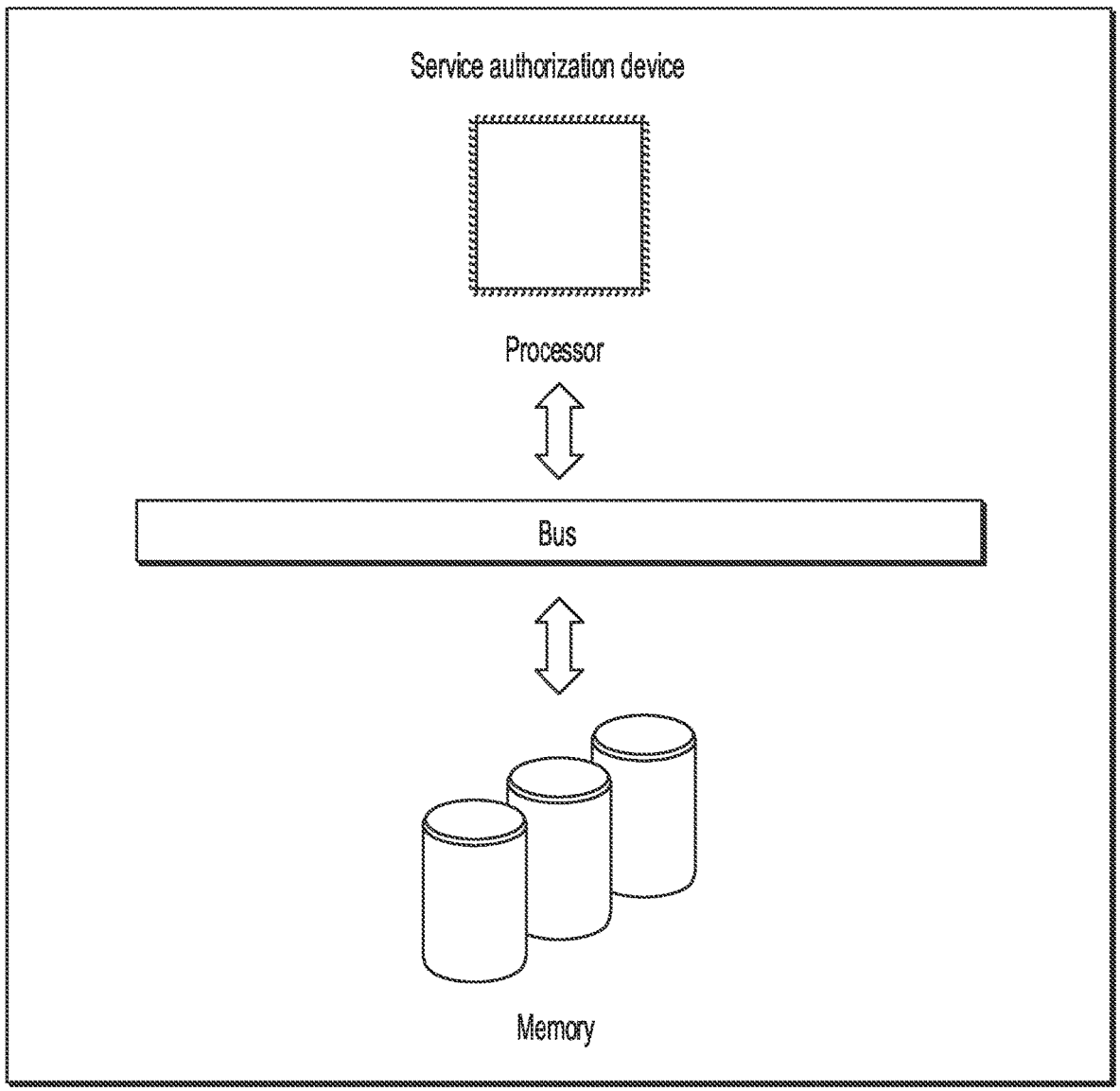
FIG. 7 is a schematic diagram illustrating a service authorization device, according to an implementation of the present specification.

Based on the previously described service authorization method, the present specification further provides a corresponding service authorization device, as shown in FIG. 7. The device includes one or more memories and processors. The memory stores a program, and the program is executed by the one or more processors to perform the following steps: obtaining information to be verified, and sending the information to be verified to a first execution unit for verification, where the first execution unit runs in a first security environment included in a system of the device; receiving signature information that is returned by the first execution unit and obtained by signing a verification result by means of a signature verification private key; and sending the signature information to a second execution unit, so that the second execution unit verifies the signature information by means of a signature verification public key corresponding to the signature verification private key, and performs service authorization based on the verification result after it is determined that the verification on the signature information succeeds, where the second execution unit runs in a second security environment included in the system of the device.

Figure 8:
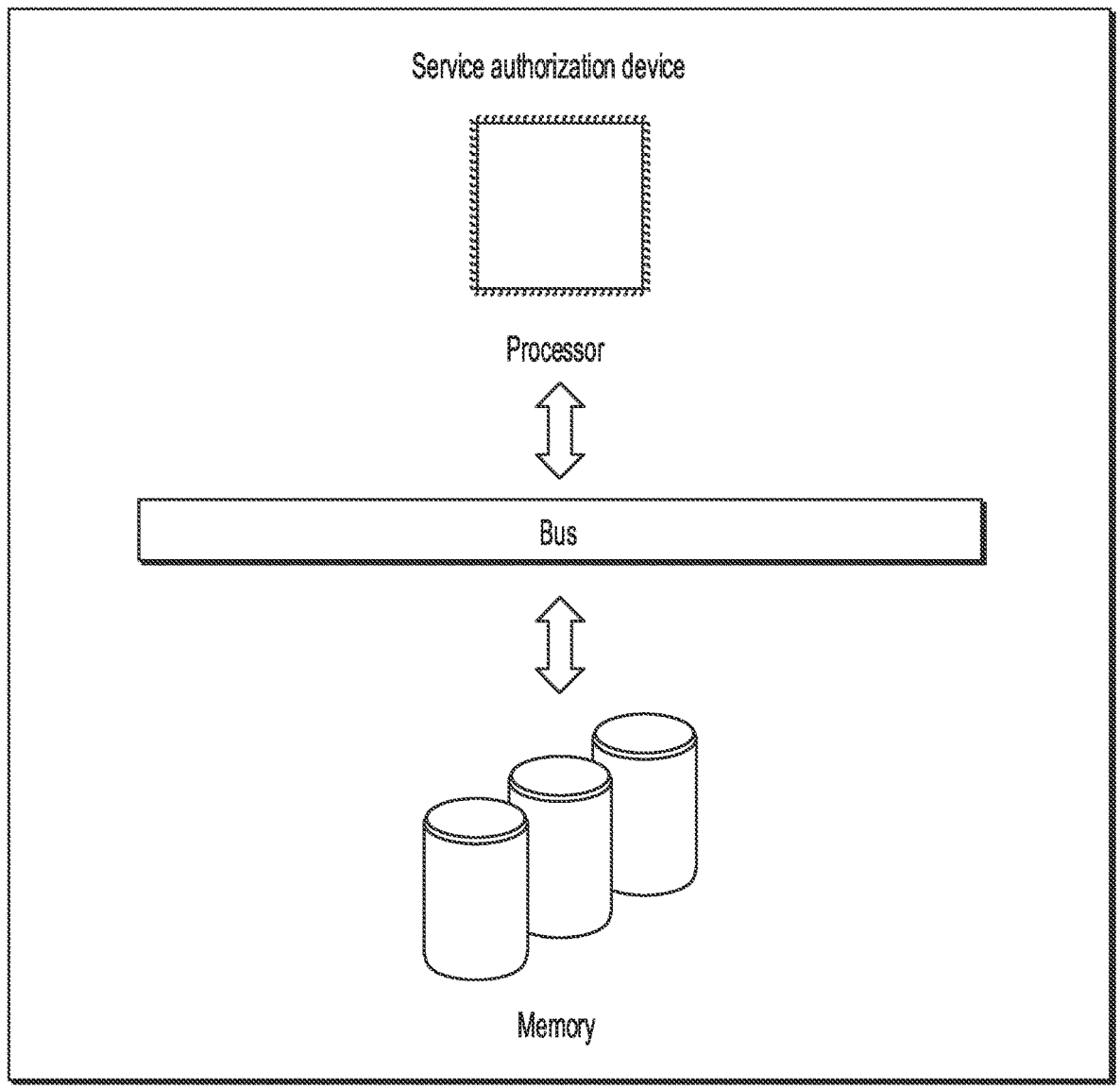
FIG. 8 is a schematic diagram illustrating a service authorization device, according to an implementation of the present specification.

Based on the previously described service authorization method, the present specification further provides a corresponding service authorization device, as shown in FIG. 8. The device includes one or more memories and processors. The memory stores a program, and the program is executed by the one or more processors to perform the following steps: receiving information to be verified sent by a service application, where a first execution unit runs in a first security environment included in a system of the device; verifying the information to be verified, and signing an obtained verification result by means of a stored signature verification private key to obtain signature information; and sending the signature information to a second execution unit by using the service application, so that the second execution unit verifies the signature information by means of a signature verification public key corresponding to the signature verification private key, and performs service authorization based on the verification result after the verification on the signature information succeeds, where the second execution unit runs in a second security environment included in the system of the device.

Figure 9:
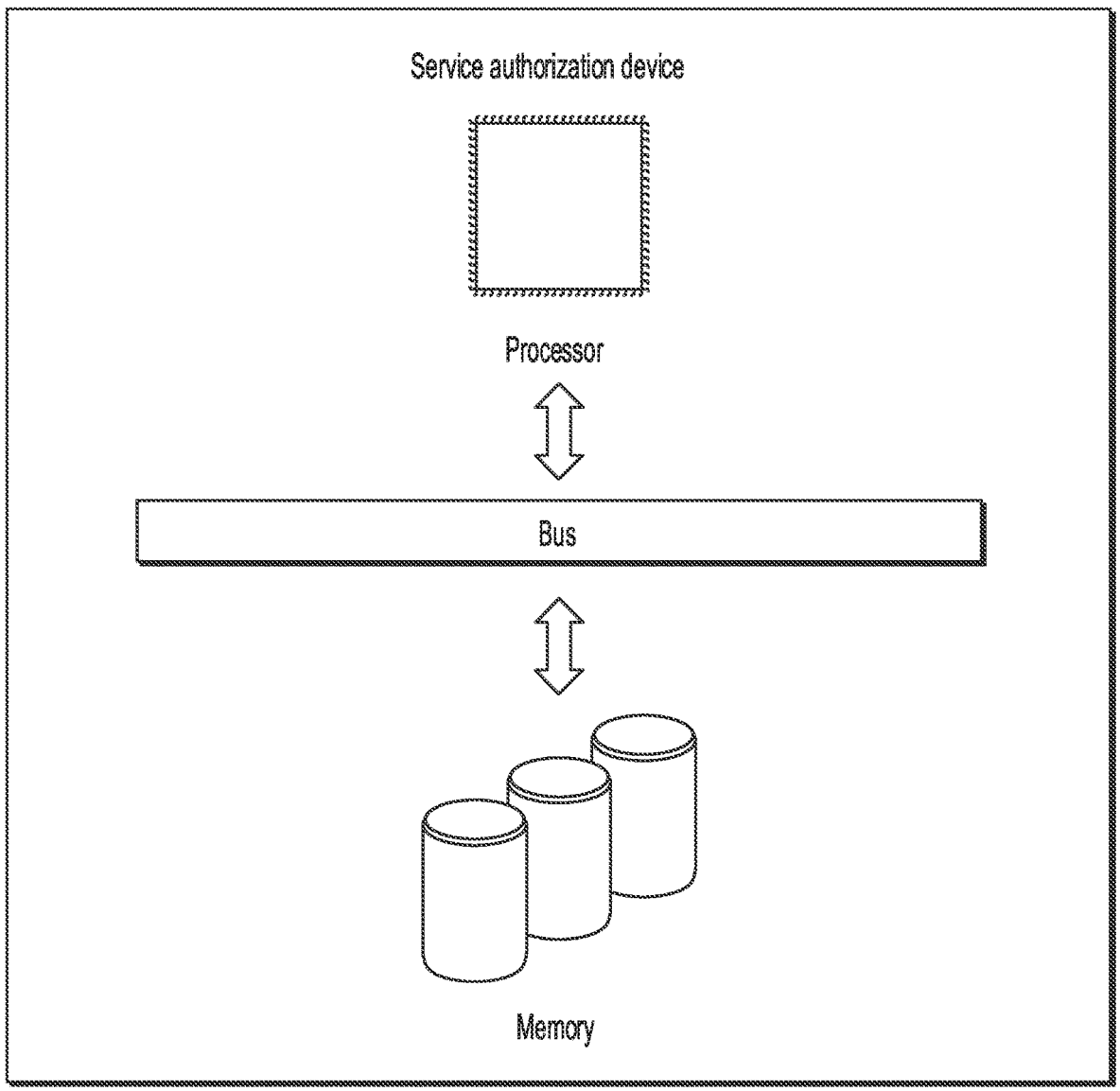
FIG. 9 is a schematic diagram illustrating a service authorization device, according to an implementation of the present specification.

Based on the previously described service authorization method, the present specification further provides a corresponding service authorization device, as shown in FIG. 9. The device includes one or more memories and processors. The memory stores a program, and the program is executed by the one or more processors to perform the following steps: obtaining signature information sent by a first execution unit by using a service application, where the signature information is obtained after the first execution unit signs a verification result by means of a signature verification private key, the verification result is obtained after the first execution unit verifies information to be verified sent by the service application, the first execution unit runs in a first security environment included in a system of the device, and a second execution unit runs in a second security environment included in the system of the device; and verifying the signature information by means of a signature verification public key corresponding to the signature verification private key, and performing, after it is determined that the verification on the signature information succeeds, service authorization based on the verification result obtained by parsing the signature information.

In the one or more implementations of the present specification, after the information to be verified is obtained, the information to be verified can be sent to the first execution unit, so that the first execution unit verifies the information to be verified, and signs the obtained verification result by means of the signature verification private key stored by the first execution unit to obtain the signature information. Then, the service application can obtain the signature information returned by the first execution unit, and then send the signature information to the second execution unit, so that the second execution unit verifies the signature information by means of the signature verification public key corresponding to the signature verification private key, and performs service authorization based on the verification result after it is determined that the verification on the signature information succeeds.

In an asymmetric encryption method, the second execution unit running in the second security environment can verify the authenticity of the verification result obtained by the first execution unit running in the first security environment. Therefore, the second execution unit can determine, based on the verification result obtained by the first execution unit, whether to authorize a service executed by the service application, and thereby a more secure and effective identity verification method is provided for a user.

In the 1990s, whether a technical improvement is a hardware improvement (for example, an improvement to circuit structures, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. This is similar to a software compiler used for program development and compiling. However, original code before compiling is also written in a specific programming language, which is referred to as a hardware description language (HDL). There are many HDLs, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, a Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program codes (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of control logic of a memory. A person skilled in the art also knows that, in addition to implementing the controller by using the computer readable program code, logic programming can be performed on method steps to allow the controller to implement the same function in forms of a logic gate, a switch, an application-specific integrated circuit, a programmable logic controller, and a built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the previous apparatus is described by dividing functions into various units. Certainly, when the present specification is implemented, function of units can be implemented in one or more pieces of software and/or hardware.

A person skilled in the art should understand that an implementation of the present specification can be provided as a method, a system, or a computer program product. Therefore, the present specification can use a form of hardware only implementations, software only implementations, or implementations with a combination of software and hardware. In addition, the present specification can use a form of a computer program product that is implemented on one or more computer-usable storage media (including but not limited to a disk memory, a CD-ROM, an optical memory, etc.) that include computer-usable program code.

The present specification is described with references to the flowcharts and/or block diagrams of the method, the device (system), and the computer program product based on one or more implementations of the present specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, a built-in processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be alternatively stored in a computer readable memory that can instruct a computer or another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be alternatively loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), input/output interfaces, network interfaces, and memories.

The memory can include a non-persistent memory, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, removable, and irremovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, magnetic tape/magnetic disk storage, another magnetic storage device, or any other non-transmission medium. The computer storage medium can be used to store information accessible by the computing device. Based on the definition in the present specification, the computer readable medium does not include transitory computer readable media (transitory media) such as a modulated data signal and carrier.

It is worthwhile to further note that the term "include", "comprise", or their any other variant is intended to cover non-exclusive inclusion, so that a process, a method, an article, or a device that includes a series of elements not only includes these elements, but also includes other elements which are not expressly listed, or further includes elements inherent to such process, method, article, or device. An element described by "includes a . . . " further includes, without more constraints, another same or identical element in the process, method, article, or device that includes the element.

The present specification can be described in the general context of computer-executable instructions, for example, a program module. The program module usually includes a routine, a program, an object, a component, a data structure, etc. for executing a specific task or implementing a specific abstract data type. The one or more implementations of the present specification can be practiced in distributed computing environments. In these distributed computing environments, tasks are executed by remote processing devices that are connected through a communications network. In the distributed computing environment, the program module can be located in both local and remote computer storage media including storage devices.

The implementations of the present specification are described in a progressive way. For same or similar parts of the implementations, references can be made to the implementations. Each implementation focuses on a difference from other implementations. Particularly, a system implementation is basically similar to a method implementation, and therefore is described briefly. For related parts, references can be made to related description in the method implementation.

Specific implementations of the present application are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily require a particular execution order to achieve the desired results. In some implementations, multi-tasking and parallel processing can be advantageous.

The previous descriptions are merely one or more implementations of the present specification, and are not intended to limit the present specification. For a person skilled in the art, the one or more implementations of the present specification can have various modifications and changes. Any modifications, equivalent replacements, and improvements made within the spirit and the principle of the one or more implementations of the present specification shall fall within the scope of the claims in the present specification.

What is claimed is:

1. A computed-implemented method, comprising:
  generating a dynamic parameter;
  setting a validity time for the dynamic parameter;
  providing, from a second execution unit running in a second security environment, through a service application, and to a first execution unit, the dynamic parameter, wherein the first execution unit runs in a first security environment that is different from the second security environment, and wherein the first execution unit is restricted from accessing the second execution unit;
  receiving, from the service application, signature information at the second execution unit, wherein the signature information is generated based on (i) a verification result, (ii) the dynamic parameter, and (iii) a signature verification private key;
  verifying, by the second execution unit, the signature information using a signature verification public key corresponding to the signature verification private key;
  verifying, by the second execution unit, the dynamic parameter by comparing the dynamic parameter to a pre-stored copy of the dynamic parameter, wherein verifying the dynamic parameter comprises
  determining that the dynamic parameter is valid when the signature information is sent to the second execution unit within the validity time; and
  in response to verifying the signature information and the dynamic parameter, performing service authorization based on the verification result to authorize a service executed by the service application.

2. The computed-implemented method of claim 1, further comprising:
  obtaining, by the first execution unit and through the service application running in the first security environment, verification information; and
  generating, by the first execution unit, the verification result based on the verification information.

3. The computed-implemented method of claim 2, wherein the verification information comprises biometric feature.

4. The computed-implemented method of claim 1, wherein the signature information is generated by the first execution unit based on signing, using the signature verification private key, the verification result and the dynamic parameter.

5. The computed-implemented method of claim 1, wherein the second security environment comprises an execution environment provided by a secure element (SE), and the first security environment comprises a trusted execution environment (TEE).

6. The computed-implemented method of claim 1, wherein the dynamic parameter comprises at least one of a random number or time information.

7. The computed-implemented method of claim 1, wherein generating the signature information by the first execution unit comprises:
obtaining, by the first execution unit, the signature verification private key from a management server corresponding to the first execution unit.

8. A computer-implemented system, comprising:
one or more computers; and
one or more computer memory devices interoperably coupled with the one or more computers and having tangible, non-transitory, machine-readable media storing one or more instructions that, when executed by the one or more computers, cause the one or more computers to perform operations comprising:
generating a dynamic parameter;
setting a validity time for the dynamic parameter;
providing, from a second execution unit running in a second security environment, through a service application, and to a first execution unit, the dynamic parameter, wherein the first execution unit runs in a first security environment that is different from the second security environment, and wherein the first execution unit is restricted from accessing the second execution unit;
receiving, from the service application, signature information at the second execution unit, wherein the signature information is generated based on (i) a verification result, (ii) the dynamic parameter, and (iii) a signature verification private key;
verifying, by the second execution unit, the signature information using a signature verification public key corresponding to the signature verification private key;
verifying, by the second execution unit, the dynamic parameter by comparing the dynamic parameter to a pre-stored copy of the dynamic parameter, wherein verifying the dynamic parameter comprises
determining that the dynamic parameter is valid when the signature information is sent to the second execution unit within the validity time; and
in response to verifying the signature information and the dynamic parameter, performing service authorization based on the verification result to authorize a service executed by the service application.

9. The computer-implemented system of claim 8, wherein the operations further comprise:
obtaining, by the first execution unit and through the service application running in the first security environment, verification information; and
generating, by the first execution unit, the verification result based on the verification information.

10. The computer-implemented system of claim 9, wherein the verification information comprises biometric feature.

11. The computer-implemented system of claim 8, wherein the signature information is generated by the first execution unit based on signing, using the signature verification private key, the verification result and the dynamic parameter.

12. The computer-implemented system of claim 8, wherein the second security environment comprises an execution environment provided by a secure element (SE), and the first security environment comprises a trusted execution environment (TEE).

13. The computer-implemented system of claim 8, wherein the dynamic parameter comprises at least one of a random number or time information.

14. The computer-implemented system of claim 8, wherein generating the signature information by the first execution unit comprises:
obtaining, by the first execution unit, the signature verification private key from a management server corresponding to the first execution unit.

15. A non-transitory, computer-readable medium storing one or more instructions that, when executed by a computer system, cause the computer system to perform operations comprising:
generating a dynamic parameter;
setting a validity time for the dynamic parameter;
providing, from a second execution unit running in a second security environment, through a service application, and to a first execution unit, the dynamic parameter, wherein the first execution unit runs in a first security environment that is different from the second security environment, and wherein the first execution unit is restricted from accessing the second execution unit;
receiving, from the service application, signature information at the second execution unit, wherein the signature information is generated based on (i) a verification result, (ii) the dynamic parameter, and (iii) a signature verification private key;
verifying, by the second execution unit, the signature information using a signature verification public key corresponding to the signature verification private key;
verifying, by the second execution unit, the dynamic parameter by comparing the dynamic parameter to a pre-stored copy of the dynamic parameter, wherein verifying the dynamic parameter comprises
determining that the dynamic parameter is valid when the signature information is sent to the second execution unit within the validity time; and
in response to verifying the signature information and the dynamic parameter, performing service authorization based on the verification result to authorize a service executed by the service application.

16. The non-transitory, computer-readable medium of claim 15, wherein the operations further comprise:
obtaining, by the first execution unit and through the service application running in the first security environment, verification information; and
generating, by the first execution unit, the verification result based on the verification information.

17. The non-transitory, computer-readable medium of claim 15, wherein the signature information is generated by the first execution unit based on signing, using the signature verification private key, the verification result and the dynamic parameter.

* * * * *